(12) United States Patent
Forslund et al.

(10) Patent No.: US 6,250,557 B1
(45) Date of Patent: Jun. 26, 2001

(54) METHODS AND ARRANGEMENTS FOR A SMART CARD WALLET AND USES THEREOF

(75) Inventors: Pär Forslund, Johanneshov; Hans Beckman, Kungsängen, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/139,552

(22) Filed: Aug. 25, 1998

(51) Int. Cl.$^7$ ..................................... G06K 19/06
(52) U.S. Cl. ........................ 235/492; 235/379; 235/375
(58) Field of Search ................................ 235/492, 375, 235/379, 380, 383, 451, 472.01, 472.02; 379/55, 56, 58

(56) References Cited

U.S. PATENT DOCUMENTS

| | | | |
|---|---|---|---|
| 5,015,830 | 5/1991 | Masuzawa et al. | 235/441 |
| 5,613,159 | 3/1997 | Colnot | 395/831 |
| 5,635,701 | 6/1997 | Gloton | 235/486 |
| 5,895,903 | 4/1999 | Abe et al. | 235/380 |
| 5,936,220 | 8/1999 | Hoshino et al. | 235/380 |

FOREIGN PATENT DOCUMENTS

| | | |
|---|---|---|
| 297 10 194 U1 | 11/1997 | (DE) . |
| 6075923 | 3/1994 | (JP) . |

*Primary Examiner*—Michael G. Lee
*Assistant Examiner*—Uchau Le
(74) *Attorney, Agent, or Firm*—Richard J. Moura; Jenkens & Gilchrist

(57) ABSTRACT

A smart card wallet with one or more smart cards. The smart card wallet includes a microcontroller connected to a data bus and one or more smart card readers. The smart card(s) in the wallet are connected to a respective reader. The microcontroller is also connected to a communication stage, such as, for example, a short range radiotelephone transceiver. The communication stage transfers data to/from the smart card(s) in the wallet to a mobile radiotelephone via a data channel over the radio air interface. The mobile radiotelephone is thus used to mediate transactions between the smart card(s) in the wallet and parties to the transactions (e.g., merchants, banks, other wallets, etc.). An embodiment provides each smart card(s) in the wallet with a separate internet protocol (IP) address. Consequently, in this case, the smart card wallet includes a local IP-based network.

25 Claims, 1 Drawing Sheet

METHODS AND ARRANGEMENTS FOR A SMART CARD WALLET AND USES THEREOF

BACKGROUND OF THE INVENTION

1. Technical Field of the Invention

The present invention relates in general to the mobile communications field and, in particular, to a smart card wallet for use in making electronic transactions via a mobile phone.

2. Description of Related Art

Smart cards are used for a variety of applications, including Subscriber Identity Module (SIM) cards in cellular phones, cash cards for banking, loyalty cards, identification cards, etc. Certain smart cards are reprogrammable, such as Java cards and MULTOS cards. Descriptions of such smart cards can be found on the World-Wide Web at "The Java Card Forum," and "www.multos.com." As such, most smart cards available today are used to store single applications. However, certain smart cards like MULTOS and Java cards exist that can store several applications (e.g., multi-application cards).

Most persons' wallets carry numerous types of cards for different services, such as, for example, credit cards, bank cards, loyalty cards, drivers licenses, etc. As such, multi-application cards would be useful to incorporate some of these services on the same card. Although such a capability provides an opportunity to reduce the number of cards carried in a wallet, it is not likely to be implemented soon. For example, competing companies would not likely to agree to have their services provided by the same card, even if such a card provides an excellent opportunity for a company to increase the exposure of its name and logo. In other words, such a card would be useful for "branding" purposes.

The existing cards are being used for single applications. For example, one card is used as a credit card, another is used for debit or loyalty applications, etc. Also, most existing cards also employ magnetic stripes to make transactions. These cards can be used directly at the sellers' locations, where they can be read by a magnetic stripe reader, or indirectly via a phone or the Internet by relaying the card number to the seller.

In the near future, most magnetic stripe cards will be replaced by smart cards. Albeit, in some countries (e.g., France and Belgium), these replacements have already occurred. For example, the so-called "Proton" card is a smart card that stores electronic "cash". In fact, pilot projects using electronic cash cards have been conducted all over Europe.

As such, in order to store electronic "money" on such a cash card, a user can visit an Automated Teller Machine (ATM), or establish an electronic connection with a bank via a processor equipped with a card reader. In the latter case, if a mobile phone were to be equipped with a smart card reader, this electronic "money" could be stored in the phone from anywhere (e.g., a "wireless wallet"). Such an approach has been disclosed in European Patent Publication No. 96-477325 and 97-181297 to W. Kubanski.

Electronic wallets holding one or two cards have also been disclosed. For example, European Patent Publication No. 97-427471 to J. Furuya et al. discloses a wallet with one card slot, a display and input buttons. European Patent Publication No. 97-427457 to Y. Abe et al. discloses a wallet with two card slots. European Patent Publication No. 90-052987 to S. Komaki et al. discloses a card reader housed inside a wallet. European Patent Publication No. 97-472591 discloses a wallet with a compartment for a card reader. As illustrated by these publications, although a number of electronic wallet approaches have been disclosed, a significant problem has arisen that is not resolved by the existing approaches.

This problem can be best illustrated by the following example. When a customer purchases an airline ticket at a counter, the ticket agent may request the customer's credit card and frequent flyer card. These cards or their account numbers are then read in or keyed in, and their respective accounts are updated to reflect the completed transaction. The read in operations are typically performed with a card reader at the ticket counter.

Alternatively, the cards' information can be provided to an agent over the phone. In that case, the customer states the card account numbers and expiration dates to the agent over the phone. Normally, the agent does not request authorization/authentication information from the customer over the phone, and the cards do not maintain "files" that can be updated to reflect the transactions made. Consequently, if an unauthorized user obtains a valid customer's credit card account number, the user can deplete the account over the phone in a relatively short time.

One way to improve the security of credit card transactions would be to use smart cards instead of magnetic stripe cards. For example, a Personal Identification Number (PIN) code could be required to allow access to account information stored on a card. Such a PIN code should provide adequate user authentication protection. However, it is not possible to make a smart credit card purchase over existing phones, because the information stored on the smart card has to be accessed and checked electronically. Nevertheless, as described in detail below, the present invention of a smart card wallet employed with a mobile phone successfully resolves this problem and other related problems.

SUMMARY OF THE INVENTION

In accordance with a preferred embodiment of the present invention, a smart card wallet is provided, which includes a microcontroller connected to one or more smart card readers via a data bus. The microcontroller is also connected to a short range radio transceiver, which communicates with a mobile phone. The mobile phone is used to transfer data to/from, and thus mediate transactions between, the smart card(s) in the wallet and parties to the transactions (e.g., merchants, banks, other wallets, etc.). In a second embodiment, each smart card(s) in the wallet has a separate IP address, which enables the smart card wallet's data bus to function and be accessed as an IP-based network.

An important technical advantage of the present invention is that relatively secure smart credit card purchases and transactions can be made over the phone.

Another important technical advantage of the present invention is that any device in communication with the smart card wallet can readily determine what services are provided by the smart cards in the wallet.

Still another important technical advantage of the present invention is that the smart cards in the wallet can be accessed automatically for their services, without the need for user interaction.

Yet another important technical advantage of the present invention is that transactions in the smart card wallet can be remotely controlled.

Still another important technical advantage of the present invention is that each smart card in the wallet can be readily accessed by using a separate IP address.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1A:
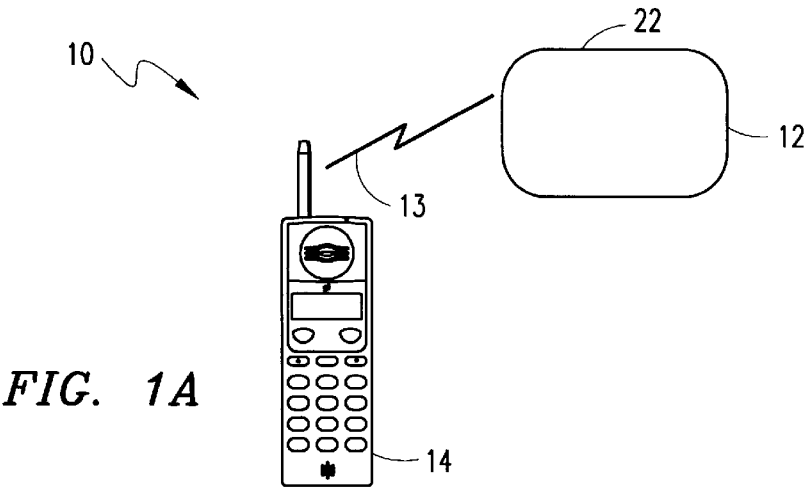
FIGS. 1A and 1B are diagrams that show an exemplary smart card wall system that can be used to implement a preferred embodiment of the present invention.
Figure 1B:
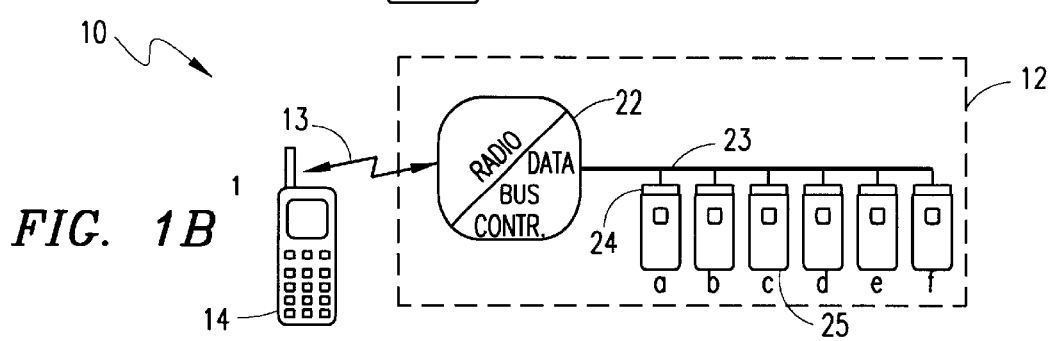
Figure 2A:
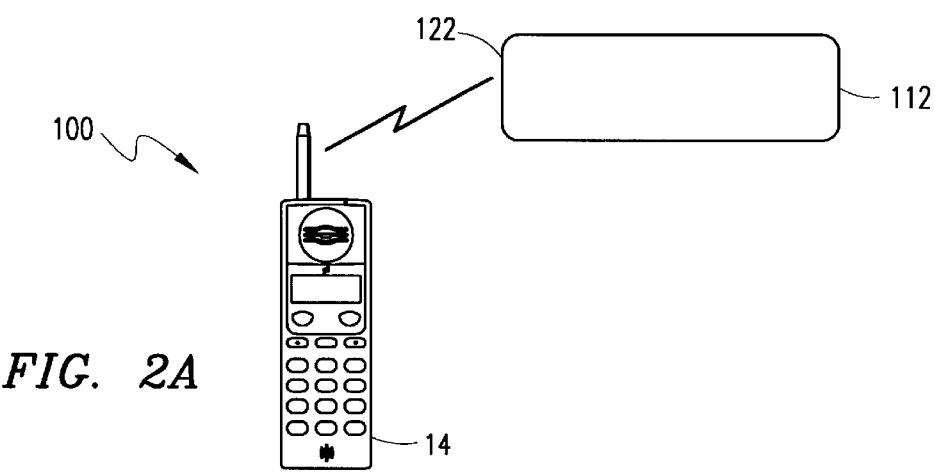
FIGS. 2A and 2B are diagrams that show a second exemplary smart card wallet system that can be used to implement a second embodiment of the present invention.

The preferred embodiment of the present invention and its advantages are best understood by referring to FIGS. 1–2A of the drawings, like numerals being used for like and corresponding parts of the various drawings.

Essentially, the present invention comprises a smart card wallet with one or more smart cards enclosed. In a preferred embodiment, the smart card wallet includes a microcontroller connected to a data bus and one or more smart card readers. The smart card(s) in the wallet are connected to a respective smart card reader. The microcontroller is also connected to an input/output communication stage, which can be, for example, a short range radiotelephone transceiver, an infrared transmitter/detector, a radio transceiver on a single chip, a wireline input/output data connection, etc. In the preferred embodiment, the communication stage functions to transfer data to/from the smart card(s) in the wallet to a mobile radiotelephone via a data channel over the radio air interface. The mobile radiotelephone can thus be used to mediate transactions between the smart card(s) in the wallet and parties to the transactions (e.g., merchants, banks, other wallets, etc.). As such, the smart card wallet can also be controlled remotely from a mobile phone, a fixed telephone, a workstation, personal computer, etc. In a second embodiment, each smart card(s) in the wallet has a separate IP address. Consequently, the smart card wallet's data bus can function and be accessed as an IP-based network.

Specifically, FIGS. 1A and 1B are diagrams that show an exemplary smart card wallet system 10 that can be used to implement a preferred embodiment of the present invention. In this exemplary embodiment, the smart card wallet system 10 includes at least one smart card wallet 12 and at least one mobile phone 14. In actuality, such a system can include a plurality of smart card wallets and mobile phones, but for simplicity sake, just one of each is shown in FIGS. 1A and 1B. On the surface, the smart card wallet 12 can have the "look and feel" of a typical wallet. Internally, the wallet 12 preferably includes a plurality of pockets (not shown), with each pocket structured to contain an individual smart card 25 (e.g., 25a–f).

For this embodiment, each such pocket in the smart card wallet 12 also contains a smart card reader 24 (e.g., 24a–f). Conventional smart card readers can be used which include plug-in input/output connections for conveying data to/from a smart card. In this regard, such a reader is actually a "reader/writer".

The exemplary smart card wallet 12 also includes a short-range radio/data bus controller 22. Each smart card reader is connected to the radio/data bus controller 22 by a data bus 23. The radio section of the radio/data bus controller 22 is structured to communicate with the mobile phone 14 via a relatively short range radio air interface or link 13 (e.g., range of about 10 feet). For this embodiment, the radio link or air interface 13 is compatible with the radio air interface normally established for the mobile phone 14 in a Public Land Mobile Network (PLMN), such as, for example, a network for a typical Global System for Mobile Communications (GSM), Advanced or Digital Advanced Mobile Phone System (AMPS or DAMPS), Personal Digital Cellular (PDC) System, Personal Communications System (PCS), etc.

The data bus controller section functions to transfer data to/from the radio section and the plurality of smart card readers 24 via the data bus 23. For this embodiment, the smart card data bus controller section can be a conventional microcontroller with appropriate auxiliary components (e.g., RAM, ROM, I/O, etc.). As such, the microcontroller controls the transfer of data between any one of the smart cards 25 and the mobile phone 14 via the radio link 13. Alternatively, data can be transferred to/from the smart card wallet to a mobile transceiver via, for example, an infrared (IR) link (e.g., the radio section is replaced with an IR transmitter/detector section), or a wireline connection can be made directly to a data connector on the mobile phone 14.

As another alternative, data can be transferred to/from the smart card wallet to a mobile transceiver via, for example, a radio transceiver on a single integrated circuit (IC) chip. A short-range radio transceiver that is fabricated on an IC chip, along with an associated exemplary air interface, is disclosed and described in co-pending U.S. patent application Ser. No. 08/803,392, which was filed on Feb. 20, 1997. The inventors are Karl Håkan Torbjörn Gardenfors, Sven Mattisson, and Jacobus Cornelis Haartsen, and the assignee is the same assignee as for this application, namely Telefonaktiebolaget L M Ericsson. Application Ser. No. 08/803,392 is hereby incorporated by reference in its entirety herein. Thus, the radio section of the radio/data bus controller 22 may be structured and operated in accordance with the radio transceiver on a chip as described in application Ser. No. 08/803,392.

The following is an example of how the smart card wallet system 10 can be used, in accordance with a preferred embodiment of the present invention. Assume that a customer contacts an airline's reservation service representative by phone (mobile or fixed phone) and books a flight reservation. In response, the airline representative gives the customer a reference (identification) number for the reservation transaction, and quotes a price for the ticket. In accordance with the preferred embodiment, when the customer pays the airline for the ticket, the customer uses a mobile phone to mediate the payment transaction.

For example, referring to FIGS. 1A and 1B, the customer's mobile phone (e.g., 14) displays a menu, which includes a listing of applications for each smart card (e.g., 25a–f) contained in the smart card wallet 12. The customer selects a smart card from the display (e.g., credit card, pre-paid cash card, etc.) that the customer intends to use to pay for the reserved airline ticket. The customer then enters into the mobile phone 14 (e.g., using the phone's keypad) a PIN code for the smart card selected for the payment transaction, and the ticket price and reference (identification) number provided by the airline representative. This payment information is stored in local memory in the mobile phone 14.

The customer can then place the powered on mobile phone 14 in a pocket or briefcase, but still in close proximity to the smart card wallet 12 (e.g., within radio range). Subsequently, an airline representative (or airline computer in an automated payment environment) establishes telephonic communications with the customer's mobile phone via a PLMN (preferably on a data channel). For example, the airline representative (or computer) can place a conventional call to the customer's mobile phone from a fixed telephone or terminal in a Public Switched Telephone Network (PSTN). The airline representative or computer inputs/transmits data containing a predefined code to the customer's mobile phone (14), which requests the mobile phone to transmit valid transaction information (e.g., an electronic "receipt") to confirm the payment transaction. For example, in response to the airline's request for valid transaction information, the mobile phone (14) can transmit information (for reception back at the airline phone or terminal) corresponding to the reference number originally provided for this ticket transaction by the airline representative. The airline can also request valid frequent flyer account information (e.g., frequent flyer account number) for that customer from the mobile phone (14). Once the airline has received the valid transaction information (and, for example, related frequent flyer information), the call between the airline and customer's mobile phone can be terminated.

Subsequently, the mobile phone 14 and smart card wallet 12 establish communication via the link 13. For example, the mobile phone 14 can set up a conventional mobile-originated call (at a relatively low transmission power level) with the radio section of the smart card wallet 12, which is powered on and in an idle state. Once the (short range) call has been set up, the mobile phone 14 sends a control message to the smart card radio/data bus controller 22, which directs the data bus controller section to update the smart card(s) selected for this transaction. As such, the data bus controller section updates the appropriate (credit, cash, etc.) smart card in the smart card wallet 12 to reflect the ticket payment transaction (e.g., subtracts the amount paid from the account balance maintained in the smart card). Also, for this example, the data bus controller section can update the frequent flyer account information on that selected smart card (e.g., increase the frequent flyer mileage balance accordingly). Notably, in accordance with the advantageous security aspects of the present invention, pertinent account information is encrypted, signed electronically, and transmitted via the data channel. For additional security, a copy (trace) of the transaction is stored on the smart card itself.

Also in accordance with the preferred embodiment of the present invention, the smart card wallet 12 advantageously provides a "smart" interface for each smart card (e.g., 25a–f) carried. In other words, when a smart card is connected to a corresponding smart card reader (e.g., 24a–f), the smart card conveys its communication protocol to the reader (and ultimately to the data bus controller section of the wallet). Alternatively, the smart card can convey a particular code from its communication protocol to the smart card reader (and thus to the controller section). Consequently, any remotely located equipment that makes a connection with a smart card reader and is capable of understanding the respective card's protocol, can communicate with the wallet 12. As such, for example, since the mobile phone 14 would be capable of understanding the communication protocol for each of the smart cards contained in the wallet 12, then the mobile phone 14 could store and maintain a user interface for each of the smart cards in the wallet (including information about the services provided by each card). Consequently, the smart card wallet 12 provides additional mobility in a sense, because it can be used anywhere as long as its use is in conjunction with an originating or terminating device that is compatible with the "smart" interface.

Figure 2B:
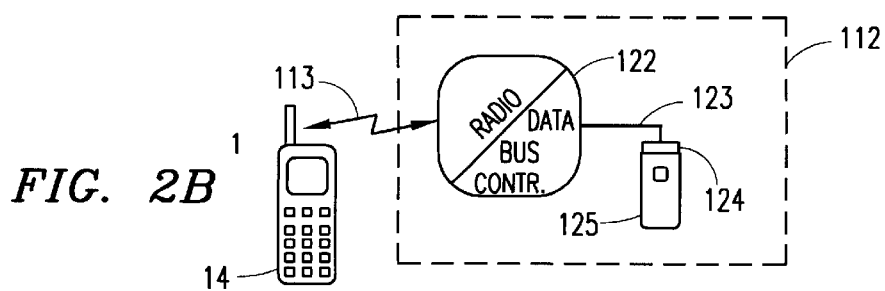

FIGS. 2A and 2B are diagrams that show a second exemplary smart card wallet system 100 that can be used to implement a second embodiment of the present invention. In this exemplary embodiment, a multi-application smart card 125 is used. For example, the multi-application smart card 125 can store and process a plurality of different smart card applications, such as for a credit card, pre-paid cash card, frequent flyer card, automobile rental card, loyalty card, electronic "purse", etc. Since only one smart card 125 is used for the plurality of applications, the smart card wallet 112 includes one pocket or slot for that card. Also, one smart card reader 124 is used as a communications interface for the multi-application smart card 125. Furthermore, for this embodiment, since only one smart card and reader are used in the wallet 112, a simple data connection 123 can be used in place of the more complex data bus 23 used in the wallet 12 shown in FIGS. 1A and 1B. The data connection 123 connects the smart card reader 124 to the radio/controller 122 in order to transfer data therebetween. The radio section of the smart card wallet 112 can communicate with the mobile phone 114 and transfer data therebetween via the radio link 113. Alternatively, as described above with respect to the exemplary smart card wallet system 10 shown in FIGS. 1A and 1B, an IR link or wireline connection can be substituted for the radio link 113. Likewise, the radio section of the radio/controller 122 may be structured and operated in accordance with the radio transceiver on a chip of application Ser. No. 08/803,392, as incorporated by reference herein above.

In operation, the multi-application smart card wallet system 100 functions similarly to the smart card wallet system 10 shown in FIGS. 1A and 1B, except in this case, only one card and card reader is used. For example, in operation, an airline representative or computer can input/transmit data containing a predefined code to the customer's mobile phone 114, which requests the mobile phone to transmit valid transaction information to confirm the payment transaction. In response to the airline's request for valid transaction information, the mobile phone 114 transmits information (for reception back at the airline phone or terminal) corresponding to the reference number originally provided for the ticket transaction by the airline representative. Also, the airline can also request the valid frequent flyer account information for that customer from the mobile phone 114. Once the airline has received the valid transaction information (and related frequent flyer information), the call between the airline and customer's mobile phone can be terminated.

Subsequently, the mobile phone 114 and smart card wallet 112 establish communications via the link 113. The mobile phone 114 sends a control message to the smart card radio/controller 122, which directs the controller section to update the smart card application(s) selected for this transaction. As such, the controller section of the smart card wallet updates the (credit, cash, etc.) application in the multi-application card in the smart card wallet 112 to reflect the ticket payment transaction (e.g., subtracts the amount paid from the account balance maintained in the card for that application). Also, the controller section can update the frequent flyer account information for that selected application on the multi-application card. Importantly, again in accordance with the advantageous security aspects of the present invention, a copy of the payment transaction remains stored on the smart card 125 in the wallet 112, and pertinent account information is encrypted, signed electronically, and transmitted via the data channel.

Additionally, in another embodiment, the local data bus (e.g., 23) in a smart card wallet system (10) can comprise a local Internet Protocol- (IP)-based network. In other words, each smart card (25*a–f*) in the wallet has its own IP address. As such, each smart card can be addressed separately via, for example, the Internet or otherwise by using the individual IP addresses. Consequently, the present invention can be utilized to provide other technical advantages.

For example, the services and/or resources available on different smart cards can be invoked by using Remote Procedure Calls (RPCs). Also, if using smart cards with applications programmed in JAVA (object-oriented), certain objects can be accessed on those cards by using the Remote Method of Invocation (RMI) Furthermore, a remote device (e.g., terminal, phone, etc.) in communication with such a smart card wallet can be equipped with additional functionality, which enables the device to communicate with a plurality of different IP-based networks. Additionally, by using an IP-based network for the data bus in a smart card wallet, a Secure Socket Layer (SSL) can be used to secure the transport of sensitive data to and from the smart card wallet. In this regard, the present invention can employ a math processor in the smart card wallet, which can be used for data encryption/decryption purposes (e.g., employing RSA, DES, etc.). In fact, such a math processor can also be used for an embodiment that does not employ IP addresses.

The following description illustrates how these features can be advantageously applied to a smart card wallet system, in accordance with the present invention. For example, in employing certain electronic cash card schemes, a security card can be used for banking with an ATM to secure the transactions between the bank and a cash card. The identity of the security card can be stored at the bank in order to verify that the ATM is to be "trusted" by the bank. However, if such an ATM is mobile, then a bank may not desire to include such a security card because of administrative and/or security reasons. In that case, it would be preferable for the bank to employ a load server (computer) that contains several of these security cards. However, the load server could provide only a fraction of the number of security cards actually needed.

In accordance with the present invention, a plurality of smart security card wallets can be used to resolve this problem. For example, if a bank desires to increase the number of security cards for a load server in an ATM, the bank can attach one or more additional smart security card wallets to increase the load server's capacity. In other words, the smart security card wallet would be a network resource.

As another example of the use of the present smart card wallet, assume that a smart card wallet (e.g., 112) includes a multi-application smart card (e.g., 125) containing an electronic cash application, loyalty application, and identification application. When the user intends to load "money" into this "electronic purse," by using the above-described RPC or RMI features and a local IP-based network on the wallet, the terminal communicating with the smart card wallet does not need to call up the cash application on a certain card. Instead, the terminal can call up a software procedure (called, for example, "Load$_{13}$Money"), which in conjunction with use of RPC/RMI, enables the smart card wallet to determine which application should be called up on and on which card (e.g., the cash application on that multi-application card).

As yet another example, assume that one user desires to transfer "money" from an electronic cash card to the cash card of another user, and that the first user has a terminal with router functionality. Consequently, the terminal can readily reach the first and second users' smart card wallet IP-based networks. The first user can invoke, for example, a method called "Withdraw" to withdraw the desired amount from the first smart card wallet, and a second method called "Deposit" to convey the "money" to the second user's smart card wallet. The first user (or user's terminal) may need to know the IP address of the second user's cash card, or the first user may direct which cash card to deposit the "money," because the method "Deposit" can be available for use in both smart card wallets.

Still another example of the present invention's use of an IP-based network on a smart card wallet is for downloading applications to the smart cards. In this case, a mobile terminal in communication with the smart card wallet can request a certain application from a "trusted" application provider, and specify the IP address (and directory, if necessary) of the smart card where the application is to be downloaded. As such, the download can be accomplished automatically and with no further interaction by the requesting user. The download can be accomplished over the data channel in the mobile terminal, which can also continue to be used for speech traffic.

The present invention's use of IP-addressed smart cards can also be used advantageously for file transfers. For example, assume that a first user has a smart card wallet with a card containing certain games (e.g., chess), which can be played with the first user's mobile terminal. The first user can call a second user and transfer the chess game file to a smart game card on a second user's smart card wallet, which can be played with the second user's mobile terminal. Alternatively, the second user can use FTP to copy the game file from the first user's smart game card, or the first user can send the second user an e-mail message with the game file attached. The second user downloads the game file from the terminal to the game card in the second user's smart card wallet, and the two users can then play the game (e.g., chess) together.

A "service discovery" application can also be implemented in accordance with the present invention. For example, the IP-based network or data bus in the present smart card wallet can be treated as a "Pico Network". As such, the smart cards (e.g., 25*a–f*) in the wallet (12) can automatically broadcast the services each provides via the link 13. Alternatively, the smart card wallet (12) can reply to an incoming request to display some or all of the services its cards provide, or the smart card wallet can receive such broadcast messages from other wallets. As another alternative, when a smart card is initially inserted into a smart card reader in the wallet (12), the embedded microcontroller in the wallet reads the service(s) that card provides, and maintains a list of services that can be provided for all smart cards in the wallet. In this case, the embedded microcontroller can automatically (or by request) broadcast the list of services via the link 13.

Assuming these features are in use, a smart card wallet user can use these features for shopping purposes. For example, prior to going to a mall, the user can store a list of items to be purchased at the mall in an appropriate smart card in the wallet. The wallet also contains a smart card with a list of discount offers entered by the user based on coupons received from some stores in that mall. As the user enters the mall, the user causes the smart card wallet to broadcast its list of services provided, which includes the list of items to be purchased and the store discount information. In response, the smart card wallet receives a list of stores and the items that they offer, in accordance with the broadcast shopping list and discount information. The user can view the received information (e.g., on the mobile phone's 14 display) and select the best stores to make the purchases. When the user is ready to pay for the purchased goods, as described earlier, the merchant can automatically check what resources are available for payment in the user's smart card wallet (12), and either extract payment or leave it up to the user to decide which payment card to use.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A smart card wallet, comprising:
   a controller;
   a communication unit coupled to said controller, said communication unit for transferring data between the smart card wallet and a mobile radiotelephone via a wireless link;
   at least one smart card reader coupled to said controller so as to transfer said data between at least one smart card and said controller,
   said at least one smart card reader associated with an internet protocol (IP) address; and
   wherein the smart card wallet is adapted to couple a first quantity of data from said at least one smart card to said communication unit, to transmit said first quantity of data from said communication unit to said mobile radiotelephone, to wait for an exchange of said first quantity of data for a second quantity of data between said mobile radiotelephone and a remote data transaction unit, to receive said second quantity of data at said communication unit from said mobile radiotelephone, and to couple said second quantity of data from said communication unit to said at least one smart card.

2. The smart card wallet of claim 1, wherein said at least one smart card reader is coupled to said controller by a data bus.

3. The smart card wallet of claim 2, wherein said data bus comprises an internet protocol (IP)-based network.

4. The smart card wallet of claim 1, wherein said controller comprises a data bus controller.

5. The smart card wallet of claim 1, wherein said communication unit comprises a radio transceiver.

6. The smart card wallet of claim 1, wherein said communication unit comprises an infrared transmitter and detector.

7. The smart card wallet of claim 1, wherein said communication unit comprises a radio transceiver on a single integrated circuit chip.

8. The smart card wallet of claim 1, wherein said at least one smart card reader is connected to a multi-application smart card.

9. The smart card wallet of claim 1, wherein said at least one smart card reader is connected to said at least one smart card, said at least one smart card including a smart interface.

10. A smart card wallet, comprising:
    a controller;
    a communication unit coupled to said controller, said communication unit for transferring data between the smart card wallet and a mobile radiotelephone via a wireless link;
    a plurality of smart card readers coupled to said controller so as to transfer data therebetween, each smart card reader of said plurality of smart card readers being associated with a different internet protocol (IP) address; and
    wherein the smart card wallet is adapted to couple a first quantity of data from at least one smart card reader of said plurality of smart card readers to said communication unit, to transmit said first quantity of data from said communication unit to said mobile radiotelephone, to wait for an exchange of said first quantity of data for a second quantity of data between said mobile radiotelephone and a remote data transaction unit, to receive said second quantity of data at said communication unit from said mobile radiotelephone, and to couple said second quantity of data from said communication unit to said at least one smart card reader.

11. A method for transferring a first quantity of data between a smart card arranged in a smart card wallet and a remote data transaction unit, comprising the steps of:
    coupling said first quantity of data from said smart card to a communication unit arranged in said smart card wallet;
    said communication unit transmitting said first quantity of data to a mobile radiotelephone via a wireless link;
    said mobile radiotelephone receiving said transmitted first quantity of data, setting up a call with said remote data transaction unit, and transferring said first quantity of data therebetween:
    said mobile radiotelephone receiving a second quantity of data from said remote data transaction unit, setting up a call with said communication unit, and transmitting said second quantity of data to said communication unit via said wireless link; and
    coupling said second quantity of data from said communication unit to said smart card.

12. The method of claim 11, wherein said first quantity of data is coupled to said communication unit by a smart card reader, a data bus, and a controller.

13. The method of claim 12, wherein said controller comprises a data bus controller.

14. The method of claim 12, wherein said data bus comprises an internet protocol (IP)-based network.

15. The method of claim 12, wherein said communication unit comprises a radio transceiver.

16. The method of claim 1, wherein said communication unit comprises an infrared transmitter and detector.

17. The method of claim 11, wherein said communication unit comprises a radio transceiver on a single integrated circuit chip.

18. The method of claim 11, wherein said smart card comprises a multi-application smart card.

19. The method of claim 11, wherein said smart card is connected to a smart card reader, said smart card reader associated with an internet protocol (IP) address.

20. The method of claim 19, wherein said smart card reader comprises one of a plurality of smart card readers arranged in said smart card wallet, each smart card reader of said plurality of smart card readers associated with a different internet protocol (IP) address.

21. A method for identifying at least one service offered by a smart card wallet, comprising the steps of:
    connecting a smart card associated with said at least one service to a smart card reader;
    reading said at least one service from said smart card;
    said smart card wallet transmitting data identifying said at least one service over a wireless link to a mobile radiotelephone;

coupling a first quantity of data from said smart card to a communication unit arranged in said smart card wallet;

said communication unit transmitting said first quantity of data to said mobile radiotelephone via said wireless link;

said mobile radiotelephone receiving said transmitted first quantity of data, setting up, a call with a remote data transaction unit, and transferring said first quantity of data therebetween;

said mobile radiotelephone receiving a second quantity of data from said remote data transaction unit, setting up a call with said communication unit, and transmitting said second quantity of data to said communication unit via said wireless link; and coupling said second quantity of data from said communication unit to said smart card.

22. The method of claim 21, wherein said data identifying said at least one service is transmitted in response to a service request received from said mobile radiotelephone.

23. The method of claim 22, wherein said service request comprises a request for a list of services offered by said smart card wallet.

24. The method of claim 21, wherein at least one of said first quantity of data and said second quantity of data is related to performing a transaction associated with said at least one service.

25. A method for identifying at least one service offered by a smart card wallet, comprising the steps of:

connecting a smart card associated with said at least one service to a smart card reader, said smart card wallet associating an internet protocol (IP) address with said smart card reader;

reading said at least one service from said smart card;

said smart card wallet transmitting data identifying said at least one service over a wireless link to a mobile radiotelephone;

coupling a first quantity of data from said smart card to a communication unit arranged in said smart card wallet;

said communication unit transmitting said first quantity of data to said mobile radiotelephone via said wireless link;

said mobile radiotelephone receiving said transmitted first quantity of data, setting up a call with a remote data transaction unit, and transferring said first quantity of data therebetween;

said mobile radiotelephone receiving a second quantity of data from said remote data transaction unit, setting up a call with said communication unit, and transmitting said second quantity of data to said communication unit via said wireless link; and coupling said second quantity of data from said communication unit to said smart card.

\* \* \* \* \*